(12) United States Patent
Yamamoto

(10) Patent No.: US 10,440,213 B2
(45) Date of Patent: Oct. 8, 2019

(54) IMAGE READING APPARATUS AND IMAGE FORMING APPARATUS

(71) Applicant: CANON KABUSHIKI KAISHA, Tokyo (JP)

(72) Inventor: Yuichi Yamamoto, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/464,676

(22) Filed: Mar. 21, 2017

(65) Prior Publication Data

US 2017/0302814 A1    Oct. 19, 2017

(30) Foreign Application Priority Data

Apr. 13, 2016    (JP) ................. 2016-080589

(51) Int. Cl.
| | |
|---|---|
| H04N 1/00 | (2006.01) |
| H04N 1/04 | (2006.01) |
| G06F 3/12 | (2006.01) |
| G06K 15/02 | (2006.01) |
| G03G 15/00 | (2006.01) |

(52) U.S. Cl.
CPC ......... *H04N 1/0464* (2013.01); *G03G 15/602* (2013.01); *G03G 15/6529* (2013.01); *H04N 1/00588* (2013.01); *H04N 1/00615* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 5,764,382 A * | 6/1998 | Shiraishi ................ | G03B 27/52 355/407 |
| 6,131,898 A | 10/2000 | Hiroi et al. | |
| 6,554,270 B2 | 4/2003 | Yamamoto | |
| 6,674,991 B2 | 1/2004 | Makino et al. | |
| 7,802,784 B2 | 9/2010 | Yamamoto | |
| 8,837,020 B2 | 9/2014 | Horiguchi | |
| 9,013,763 B2 * | 4/2015 | Kubo ..................... | H04N 1/123 358/474 |
| 2002/0036808 A1 * | 3/2002 | Tohyama ............. | H04N 1/0464 358/497 |

(Continued)

FOREIGN PATENT DOCUMENTS

| | | | | |
|---|---|---|---|---|
| JP | 2007-006104 | * | 1/2007 | ............... H04N 1/00 |
| JP | 2011-119920 A | | 6/2011 | |
| JP | 2013-251692 A | | 12/2013 | |

*Primary Examiner* — Beniyam Menberu
(74) *Attorney, Agent, or Firm* — Venable LLP

(57) ABSTRACT

An image reading apparatus includes a projection portion arranged between a first reading position of a first image reading portion and a second reading position of a second image reading portion in a sheet conveyance direction. The projection portion projects from one of an upper surface of a main body unit and a lower surface of a sheet conveyer and is arranged outside an area through which a sheet on a conveyance path passes in a width direction orthogonal to the sheet conveyance direction. A gap of the conveyance path in a height direction between the upper surface of the main body unit and the lower surface of the sheet conveyer is secured by the projection portion abutting against the other of the upper surface and the lower surface outside the area.

15 Claims, 10 Drawing Sheets

(56) References Cited

U.S. PATENT DOCUMENTS

| | | | | |
|---|---|---|---|---|
| 2002/0036809 A1* | 3/2002 | Tohyama | ............ | H04N 1/0464 358/498 |
| 2004/0008386 A1* | 1/2004 | Shiraishi | ............... | H04N 1/121 358/474 |
| 2006/0023266 A1* | 2/2006 | Ohara | ................. | H04N 1/0318 358/474 |
| 2010/0225983 A1* | 9/2010 | Fujii | ................. | H04N 1/00909 358/498 |
| 2012/0119432 A1* | 5/2012 | Kambayashi | ........ | B65H 3/0607 271/10.02 |
| 2013/0342882 A1* | 12/2013 | Takahashi | .......... | H04N 1/00615 358/498 |
| 2014/0177012 A1* | 6/2014 | Kubo | ..................... | H04N 1/123 358/474 |
| 2015/0222777 A1* | 8/2015 | Enomoto | ............... | H04N 1/123 358/496 |
| 2015/0239693 A1* | 8/2015 | Kurokawa | ........... | B65H 3/5223 271/3.23 |
| 2015/0264194 A1* | 9/2015 | Kubo | ................ | H04N 1/00572 358/1.12 |
| 2016/0057300 A1* | 2/2016 | Ishizuka | ............ | H04N 1/00554 358/474 |
| 2016/0216677 A1 | 7/2016 | Matsumoto et al. | | |
| 2016/0227048 A1* | 8/2016 | Akimatsu | ............ | H04N 1/0057 |
| 2016/0360046 A1* | 12/2016 | Katayama | ............ | H04N 1/0057 |
| 2016/0360057 A1* | 12/2016 | Ogasawara | ........ | H04N 1/00795 |

* cited by examiner

IMAGE READING APPARATUS AND IMAGE FORMING APPARATUS

BACKGROUND OF THE INVENTION

Field of the Invention

The present invention relates to an image reading apparatus configured to read images on a sheet, and an image forming apparatus equipped with the same.

Description of the Related Art

Hitherto, Japanese Unexamined Patent Application Publication No. 2013-251692 proposes an image reading apparatus having a sheet conveyance unit provided above an image reading unit, and configured to read an image on a document fed from a sheet conveyance unit through an image reading portion. A transparent member composed of glass or the like is provided on the image reading unit, and the image reading unit is configured to read image information of the document conveyed from the sheet conveyance unit by the image reading portion via the transparent member.

Such image reading apparatus adopts a configuration in which a document passes through a conveyance path clearance (hereinafter referred to as a gap) formed of a sheet guide portion at a lower portion of the sheet conveyance unit and the transparent member at an upper portion of the image reading unit. Therefore, the positioning of the sheet conveyance unit with respect to the image reading unit in a height direction of the sheet conveyance unit and the image reading unit, that is, the vertical direction seen from the front direction of the apparatus, is important. Specifically, the gap between the sheet guide portion and the transparent member is formed by projections projecting from the lower portion of the sheet conveyance unit toward the image reading unit abutting against the transparent member.

Further, Japanese Unexamined Patent Application Publication No. 2011-119920 proposes an image reading apparatus having a first reading portion provided on an image reading unit and configured to read an image on a first surface of a document, and a second reading portion provided on a sheet conveyance unit and configured to read an image on a second surface of the document. The second reading portion is arranged downstream of the first reading portion in the sheet conveyance direction, and the first and second reading portions are configured to read the image on the sheet conveyed through the gap.

If the image reading apparatus disclosed in Japanese Unexamined Patent Application Publication No. 2011-119920 secures the gap by projections abutting against the transparent member provided on the first reading portion side in a way of the image reading apparatus disclosed in Japanese Unexamined Patent Application publication No. 2013-251692, the sheet conveyance unit sinks down at the second reading portion side by its own weight. Thereby, the gap at the reading position of the second reading portion is narrowed, so that conveyance failure of thick paper having a high stiffness or a thin paper having a low stiffness, or image defects in which the image is distorted, may occur.

SUMMARY OF THE INVENTION

According to a first aspect of the present invention, an image reading apparatus includes a main body unit, a sheet conveyance unit supported in an openable/closable manner on the main body unit and configured to convey a sheet, a conveyance path including a first transparent member provided on an upper surface of the main body unit, and a second transparent member provided on a lower surface of the sheet conveyance unit, through which the sheet conveyed by the sheet conveyance unit passes, a first image reading portion provided on the main body unit, and configured to read an image on a first surface of the sheet conveyed on the conveyance path via the first transparent member at a first reading position, a second image reading portion provided on the sheet conveyance unit downstream of the first image reading portion in a sheet conveyance direction, and configured to read an image on a second surface opposite from the first surface of the sheet conveyed on the conveyance path via the second transparent member at a second reading position, and a conveyance path securing portion arranged between the first reading position of the first image reading portion and the second reading position of the second image reading portion in the sheet conveyance direction, and configured to secure the conveyance path between the upper surface of the main body unit and the lower surface of the sheet conveyance unit.

According to a second aspect of the present invention, the image reading apparatus includes a main body unit, a sheet conveyance unit supported in an openable/closable manner on the main body unit and configured to convey a sheet, a conveyance path including a first transparent member provided on an upper surface of the main body unit, and a second transparent member provided on a lower surface of the sheet conveyance unit, through which the sheet conveyed by the sheet conveyance unit passes, a first image reading portion provided on the main body unit, and configured to read an image on a first surface of the sheet conveyed on the conveyance path via the first transparent member at a first reading position, a second image reading portion provided on the sheet conveyance unit downstream of the first image reading portion in a sheet conveyance direction, and configured to read an image on a second surface opposite from the first surface of the sheet conveyed on the conveyance path via the second transparent member at a second reading position, a third conveyance path securing portion arranged downstream of the second reading position of the second image reading portion in the sheet conveyance direction and configured to secure the conveyance path between the upper surface of the main body unit and the lower surface of the sheet conveyance unit, and a fourth conveyance path securing portion arranged upstream of the first reading position of the first image reading portion in the sheet conveyance direction and configured to secure the conveyance path together with the first conveyance path securing portion.

According to a third aspect of the present invention, the image reading apparatus includes a main body unit, a sheet conveyance unit supported in an openable/closable manner on the main body unit and configured to convey a sheet, a conveyance path including a first transparent member provided on an upper surface of the main body unit, and a second transparent member provided on a lower surface of the sheet conveyance unit, through which the sheet conveyed by the sheet conveyance unit passes, a first image reading portion provided on the main body unit, and configured to read an image on a first surface of the sheet conveyed on the conveyance path via the first transparent member at a first reading position, a second image reading portion provided on the sheet conveyance unit downstream of the first image reading portion in a sheet conveyance direction, and configured to read an image on a second surface opposite from the first surface of the sheet conveyed on the conveyance path via the second transparent member at a second reading position, and a projection arranged between the first reading position of the first image reading portion and the second reading position of the second image reading portion in the sheet conveyance direction, and projected from one of the upper surface of the main body unit and the lower surface of the sheet conveyance unit, wherein the conveyance path is secured between the upper surface and the lower surface by the projection abutting against the other of the other upper surface and the lower surface.

Further features of the present invention will become apparent from the following description of exemplary embodiments with reference to the attached drawings.

DESCRIPTION OF THE EMBODIMENTS

<First Embodiment>

Figure 1:
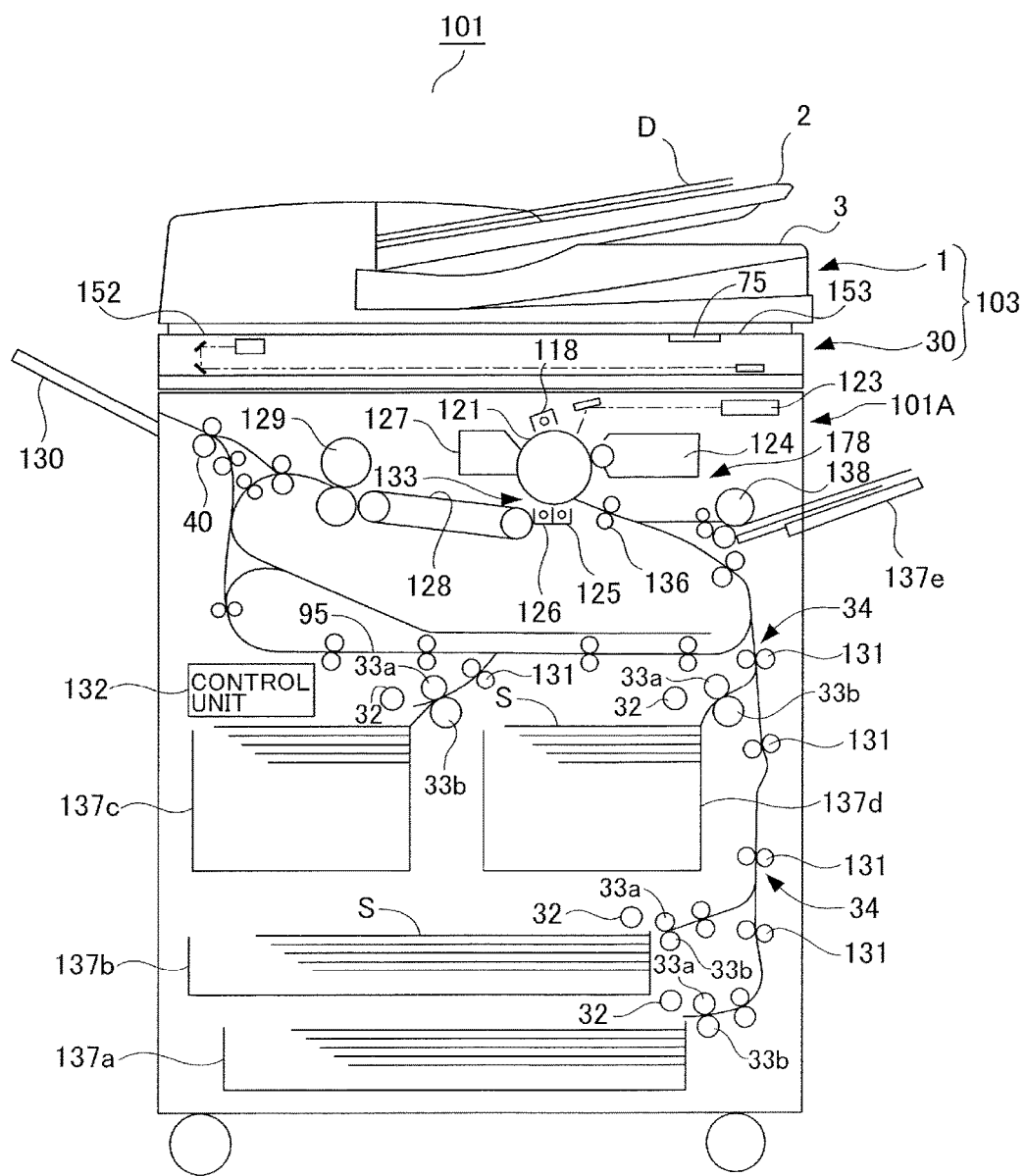
FIG. 1 is a schematic cross-sectional view illustrating an entire configuration of an image forming apparatus according to a first embodiment.

Now, an image reading apparatus and an image forming apparatus according to a first embodiment in which the present invention is applied to a printer will be described. The image forming apparatus according to the present invention can be composed of a copying machine, a facsimile, a printer or a multifunction machine, and it is equipped with an image reading apparatus having an automatic document feeder (hereinafter referred to as ADF) capable of feeding sheet-like documents and the like to a first image reading portion and a second image reading portion.

At first, a general configuration of the image forming apparatus according to the present embodiment will be described with reference to the drawings. The dimensions, materials, shapes, relative arrangements and so on of the components described in the following description are not intended to limit the scope of the present invention to the disclosed examples. In the following description, a sheet S fed from sheet supporting portions 137a through 137d on which image has not yet been formed and a document D fed from a document sheet feed tray 2 and having an image formed thereon are both defined as sheets according to the present invention. Further, in the following description, the titles are provided merely for convenience to describe the contents of the description in a simple manner, and the apparatuses and units named in the respective titles are not the only components constituting the device of each title. In the drawings, identical components and identical portions are denoted with the same reference numbers, and the descriptions are omitted.

[Image Forming Apparatus]

FIG. 1 is a schematic cross-sectional view illustrating an entire configuration of an image forming apparatus 101 according to the present embodiment. In the following description, a position in which a user faces an operating portion 75 to perform various input or setting operations of the image forming apparatus 101 is referred to as a "front direction" of the image forming apparatus 101, and a rear side is referred to as a "back direction". That is, FIG. 1 illustrates an internal configuration of the image forming apparatus 101 seen from the front direction.

As illustrated in FIG. 1, the image forming apparatus 101 includes an image reading apparatus 103 capable of reading images on a document D supported on a document sheet feed tray 2, and an image forming apparatus body (hereinafter referred to as apparatus body) 101A capable of forming the read image onto a sheet S. The image forming apparatus 101 is equipped with a control unit 132 controlling the image reading apparatus 103, the apparatus body 101A and so on.

An image forming unit 178 configured to form images on the sheet S, and sheet support portions 137a, 137b, 137c and 137d, are provided on the apparatus body 101A. A photosensitive drum 121 on which a toner image is formed, an exposure unit 123 configured to irradiate laser beams to the photosensitive drum 121, and a transfer electrifier 125 configured to transfer the toner image onto the sheet S, are arranged in the image forming unit 178. Further, a separation charger 126 configured to separate the sheet S on which the toner image has been transferred from the photosensitive drum 121 and a belt conveyance unit 128 are arranged in the image forming unit 178. Further, a sheet discharge roller pair 40 configured to discharge the sheet S on which the image has been formed to an exterior, or outer side, of the apparatus body 101A and a sheet discharge tray 130 on which the discharged sheet S is supported are arranged in the apparatus body 101A.

A fixing unit 129 configured to fix the toner image is arranged downstream in the sheet conveyance direction of the belt conveyance unit 128. Further, a registration roller pair 136 is arranged upstream in the sheet conveyance direction of the transfer electrifier 125.

The sheet supporting portions 137a through 137d are configured, for example, of sheet feed cassettes on which sheets S of various sizes are supported. A sheet feeding unit configured to feed the sheets S from each of the sheet supporting portions 137a through 137d to the image forming unit 178 are arranged in the apparatus body 101A. The sheet feeding unit 34 includes a feed roller 32 configured to send out the sheets S respectively stored in the sheet supporting portions 137a through 137d, and a conveyance roller 33a and a separation roller 33b arranged to face each other and configured to separate the sheets S one by one and conveying the sheets. The sheet S conveyed by the conveyance roller 33a and the separation roller 33b is conveyed via conveyance roller pairs 131 to the registration roller pair 136.

[Image Reading Apparatus]

Figure 2:
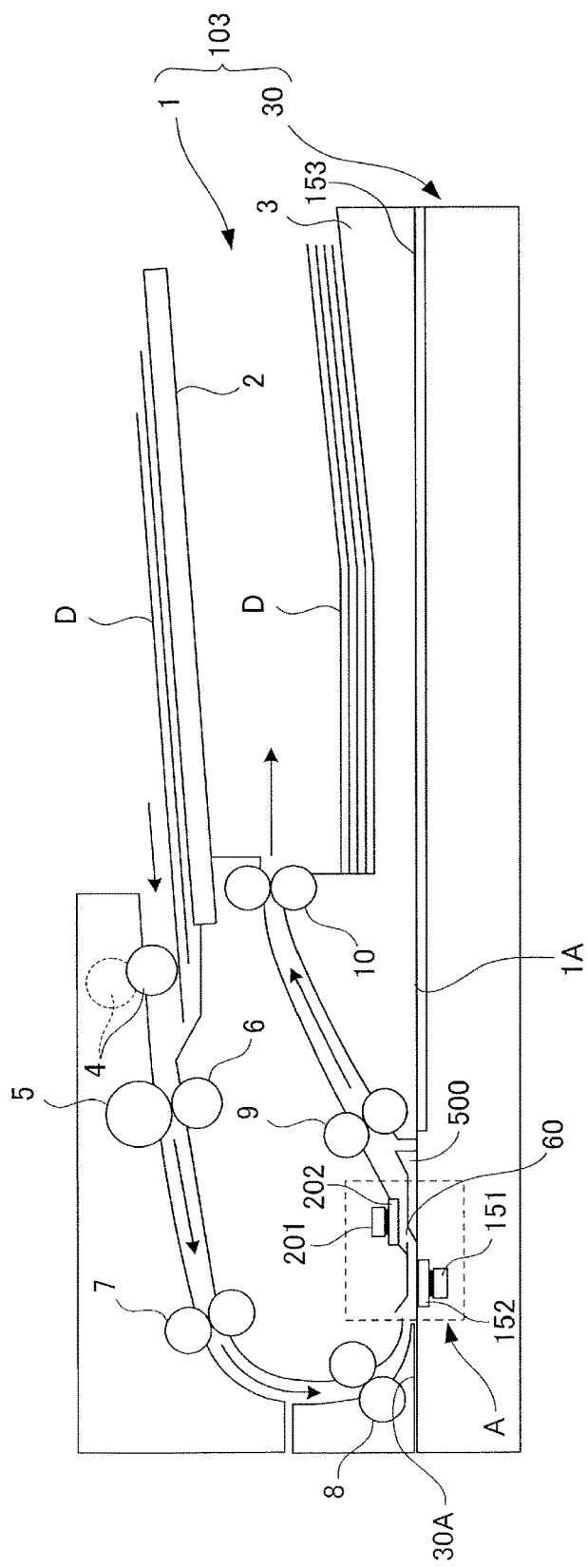
FIG. 2 is a schematic cross-sectional view illustrating an image reading apparatus.
Figure 4:
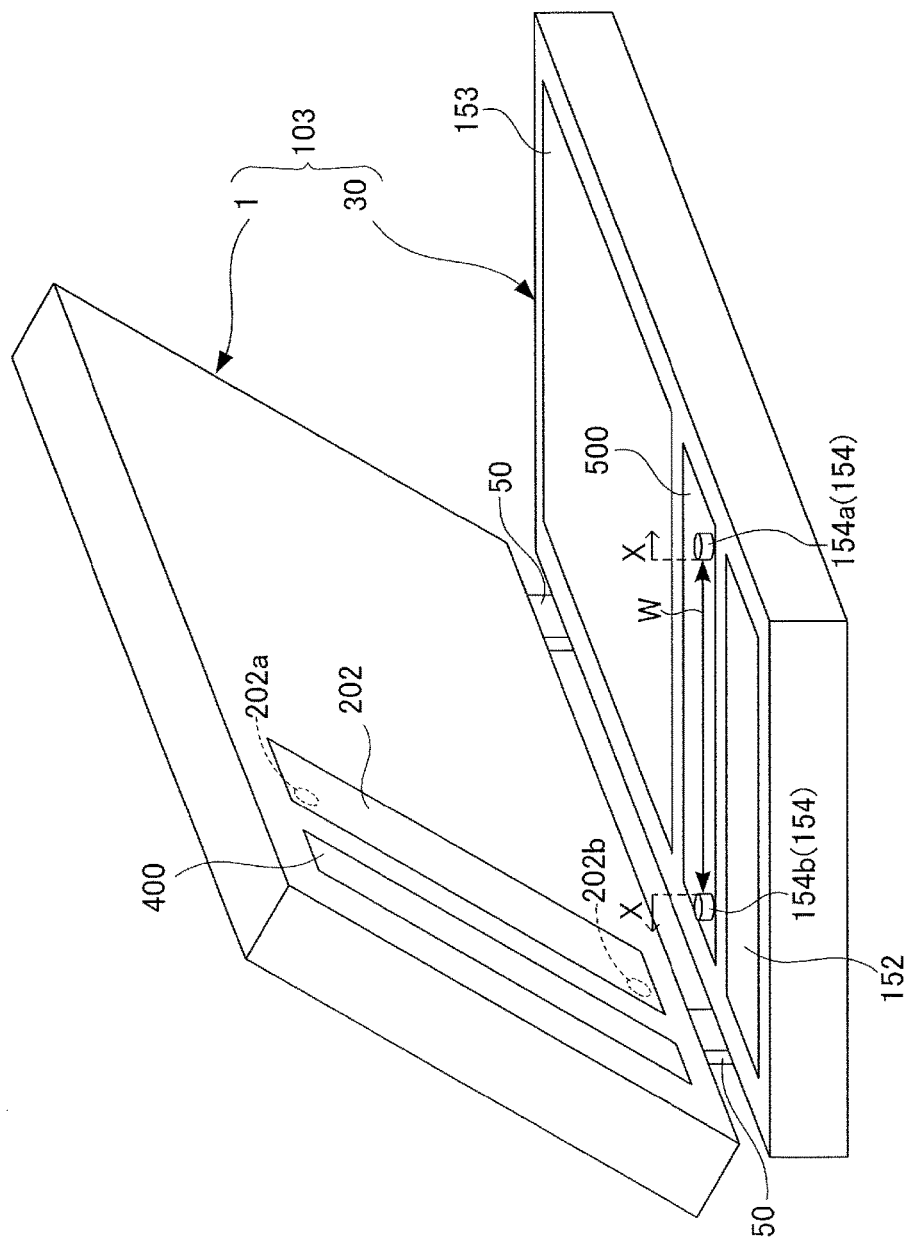
FIG. 4 is a perspective view illustrating a state in which an ADF is opened with respect to a scanner unit.

Next, the image reading apparatus 103 will be described with reference to FIGS. 1, 2 and 4. FIG. 2 is a schematic cross-sectional view illustrating the image reading apparatus 103 according to the present embodiment. FIG. 4 is a perspective view illustrating a state in which an ADF 1 according to the present embodiment is opened with respect to a scanner unit 30.

As illustrated in FIGS. 1, 2 and 4, the image reading apparatus 103 includes the scanner unit 30 configured to read images on a document D, and the ADF 1 configured to automatically feed the document D to the scanner unit 30. The image reading apparatus 103 can be configured as a single-unit apparatus, such as a flatbed scanner equipped with the ADF 1, or it can be suitably adopted in copying machines, facsimiles and so on. The ADF 1 serving as sheet conveyance unit is supported in an openable/closable manner to the scanner unit 30, serving as a main body unit.

The image reading apparatus 103 includes a first image reading portion 151 arranged on the side of the scanner unit 30, and a second image reading portion 201 arranged on the side of the ADF 1. A contact image sensor (hereinafter referred to as CIS) adopting an unmagnified optical system is used respectively in the first image reading portion 151 and the second image reading portion 201. The CIS adopts a configuration in which an LED array (not shown) as light source irradiates light on an image information surface of the document D, and image is formed on sensor elements (not shown) by reflected light reflected on an image information surface, by which image information is read. The first image reading portion 151 and the second image reading portion 201 are not restricted to those adopting CIS systems, and they can also adopt CCD (Charge Coupled Device) systems and the like.

[Scanner Unit]

Figure 3:
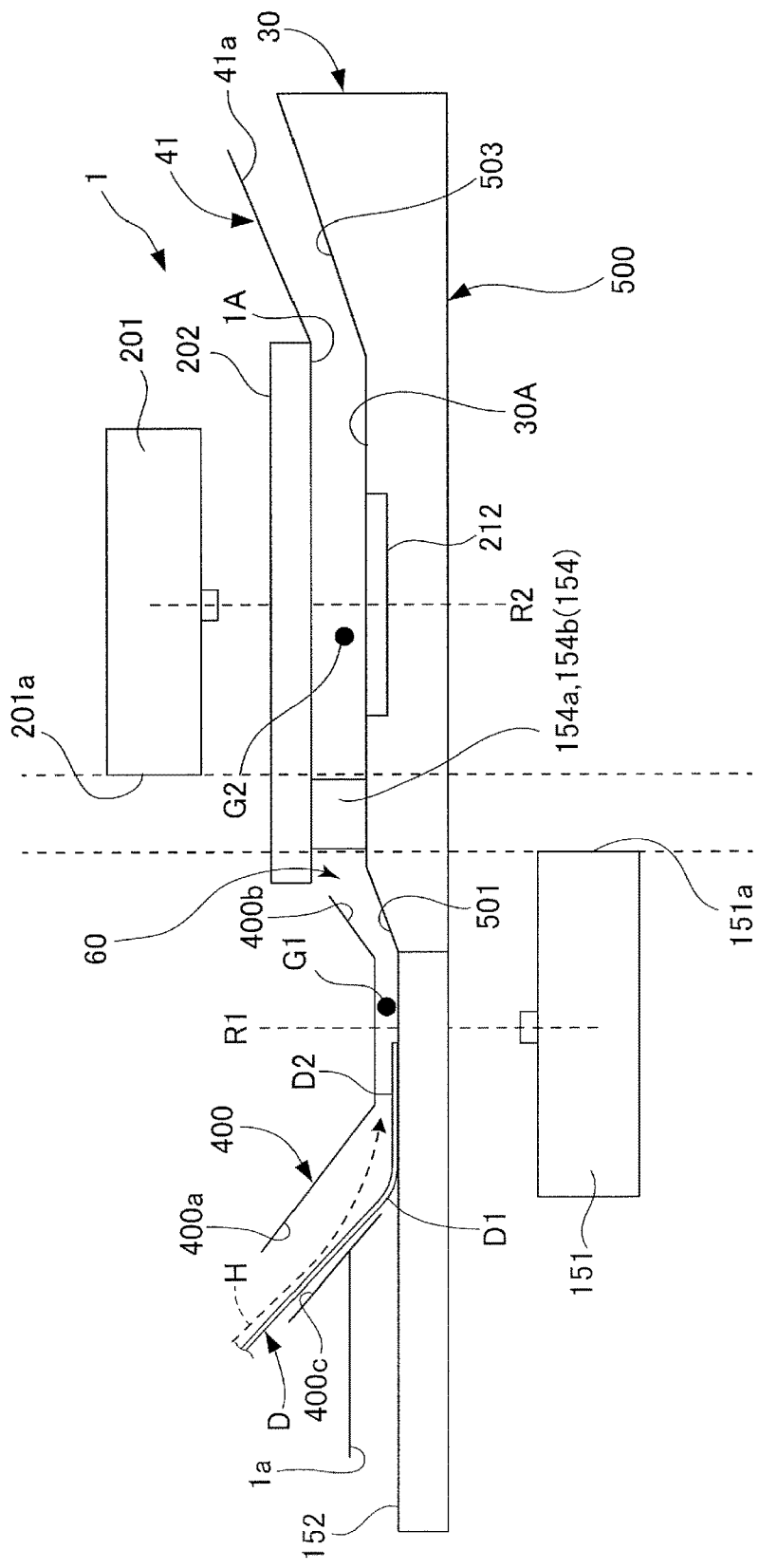
FIG. 3 is a schematic cross-sectional view illustrating a portion of the image reading apparatus in enlarged view.

As illustrated in FIGS. 2 through 4, the scanner unit includes a first scanning glass 152 serving as a first transparent member provided on an upper surface of the scanner unit 30. Further, the scanner unit 30 includes a platen glass 153 arranged adjacent to the first scanning glass 152 in a horizontal direction. The first scanning glass 152 is positioned between an upstream conveyance guide 400 and the first image reading portion 151 in the vertical direction, and extends in a width direction orthogonal to a document conveying direction H, i.e., a sheet conveyance direction. Moreover, the scanner unit 30 has the first image reading portion 151 arranged below the first scanning glass 152 so as to read the image on a first surface D1, which is the surface of a document D being conveyed.

The first image reading portion 151 reads the image on the first surface D1 of the document D conveyed on a conveyance path 60 via the first scanning glass 152. That is, the first image reading portion 151 is configured to receive reflected light of the light irradiated on the first surface D1 of the document being conveyed at a first reading position (position denoted by R1 of FIG. 3), read the image optically and convert it into electric signals, and create image data based on the electric signals.

[ADF]

As illustrated in FIGS. 2 through 4, the ADF 1 includes the document sheet feed tray 2, a sheet discharge tray and the second image reading portion 201, and feeds a document D to the first image reading portion 151 on the scanner unit 30 side, and to the second image reading portion 201. The ADF 1 is connected to the scanner unit 30 so that it can be opened and closed in the vertical direction around a hinge device 50 (refer to FIG. 4) provided on a rear end portion, that is, back direction in the drawing of FIGS. 2 through 4, of the scanner unit 30. Thereby, the ADF 1 is configured to be able to switch between a closed state, that is, the state illustrated in FIGS. 1 through 3, in which a lower surface 1A of the ADF 1 and an upper surface 30A of the scanner unit 30 face each other, and an opened state, that is, the state illustrated in FIG. 4, in which the lower surface 1A of the ADF 1 and the upper surface 30A of the scanner unit 30 are exposed.

A feed roller 4 supported in a descendible manner from a broken line position, that is, position illustrated by broken lines, to a solid line position, that is, position illustrated by solid lines, as illustrated in FIG. 2 is arranged downstream in the document conveying direction of the document sheet feed tray 2. Further, a separation roller 5 and a retard roller 6 abutting against the separation roller 5 from below and forming a separation nip portion therewith are arranged downstream in the document conveying direction of the feed roller 4. A registration roller pair 7 against which the separated document D is abutted in a rotation stop state to perform screw feed correction, and then conveying the document downstream, is arranged downstream in the document conveying direction of the separation roller 5 and the retard roller 6. A conveyance roller pair 8 configured to send the document D to the first scanning glass 152 and a second scanning glass 202, serving as a second transparent member, is arranged downstream in the document conveying direction of the registration roller pair 7. The second scanning glass 202 is provided on the lower surface 1A of the ADF 1.

The second image reading portion 201 is arranged to oppose to the first image reading portion 151 intervening the conveyance path 60 and is arranged downstream in the document conveying direction of the first image reading portion 151. The second image reading portion 201 reads the image on a second surface D2 opposite to the first surface D1 of the document D conveyed on the conveyance path 60 via the second scanning glass 202. That is, the second image reading portion 201 is configured to receive reflected light of the light irradiated onto the second surface D2 of the document D being conveyed at a second reading position (position denoted by R2 of FIG. 3), read the image optically and convert it into electric signals, and create image data based on the electric signals.

[Configuration for Securing Conveyance Path]

Next, a configuration for securing gaps G1 and G2, which are distances in a sheet thickness direction of the conveyance path 60 formed between the upper surface 30A of the scanner unit 30 and the lower surface 1A of the ADF 1 will be described with reference to FIG. 3. As illustrated in FIG. 3, in a state where the ADF 1 is closed with respect to the scanner unit 30, a conveyance path securing portion 154 serving as projections is provided between a first reading position R1 of the first image reading portion 151 and a second reading position R2 of the second image reading portion 201 in the document conveying direction H. That is, the conveyance path securing portion 154 is arranged between a downstream end 151a of the first image reading portion 151 and an upstream end 201a of the second image reading portion 201 with respect to the document conveying direction H. The conveyance path securing portion 154 is arranged at a position close to both the first image reading portion 151 and the second image reading portion 201, and ensures both the gap G1 near the first image reading portion 151 and the gap G2 near the second image reading portion 201. These gaps G1 and G2 constitute clearances through which the document D passes.

As illustrated in FIG. 4, the conveyance path securing portion 154 is arranged outside a sheet passing area W through which the sheet on the conveyance path 60 (refer to FIG. 3) passes in a width direction orthogonal to the document conveying direction. In the present embodiment, the conveyance path securing portion 154 has a projection member 154a serving as a first member on one side of a non-sheet passing area X outside in the width direction of the sheet passing area W, and has a projection member 154b serving as a second member on the other side. These projection members 154a and 154b are projected from a downstream conveyance guide 500 of the scanner unit 30, and in a state where the ADF 1 is closed, the members abut against abutting positions 202a and 202b upstream of the second scanning glass 202.

As described, the second scanning glass 202 is extended in the width direction to a position opposed to the non-sheet passing area X, and by having the projection members 154a and 154b directly abut against the second scanning glass 202, crossing of components can be reduced, and the gaps G1 and G2 can be secured highly accurately. Further, since the projection members 154a and 154b are arranged in the non-sheet passing area X, the members will not interfere with the document D being conveyed, and the members stably retain the ADF 1 at the front and back directions of the image forming apparatus 101, so that jamming is prevented effectively.

As illustrated in FIGS. 3 and 4, the ADF 1 has the upstream conveyance guide 400 arranged to face the first scanning glass 152. The upstream conveyance guide 400 includes first guide surfaces 400a and 400c configured to guide the conveyed document D to the first reading position R1 of the first image reading portion 151, and a second guide surface 400b configured to guide the document D to the second reading position R2 of a second image reading portion 201.

The scanner unit 30 has the downstream conveyance guide 500 arranged to face the second scanning glass 202. The downstream conveyance guide 500 includes a first opposing guide surface 501 opposed to the second guide surface 400b of the upstream conveyance guide 400, and a second opposing guide surface 503 opposed to a third guide surface 41a of a guide member 41 attached downstream in the document conveying direction of the second scanning glass 202. As described, the conveyance path 60 is composed of the first scanning glass 152 and the downstream conveyance guide 500 provided on the upper surface 30A of the scanner unit 30, and the upstream conveyance guide 400 and the second scanning glass 202 provided on the lower surface 1A of the ADF 1. The gaps G1 and G2 of the conveyance path 60 are secured highly accurately by the conveyance path securing portion 154 including the projection members 154a and 154b. Further, a white reference member 212 for shading compensation is attached to an upper surface of the downstream conveyance guide 500, and similarly, a white reference member not shown is also attached to a lower surface of the upstream conveyance guide 400.

[Control System]

Figure 5:
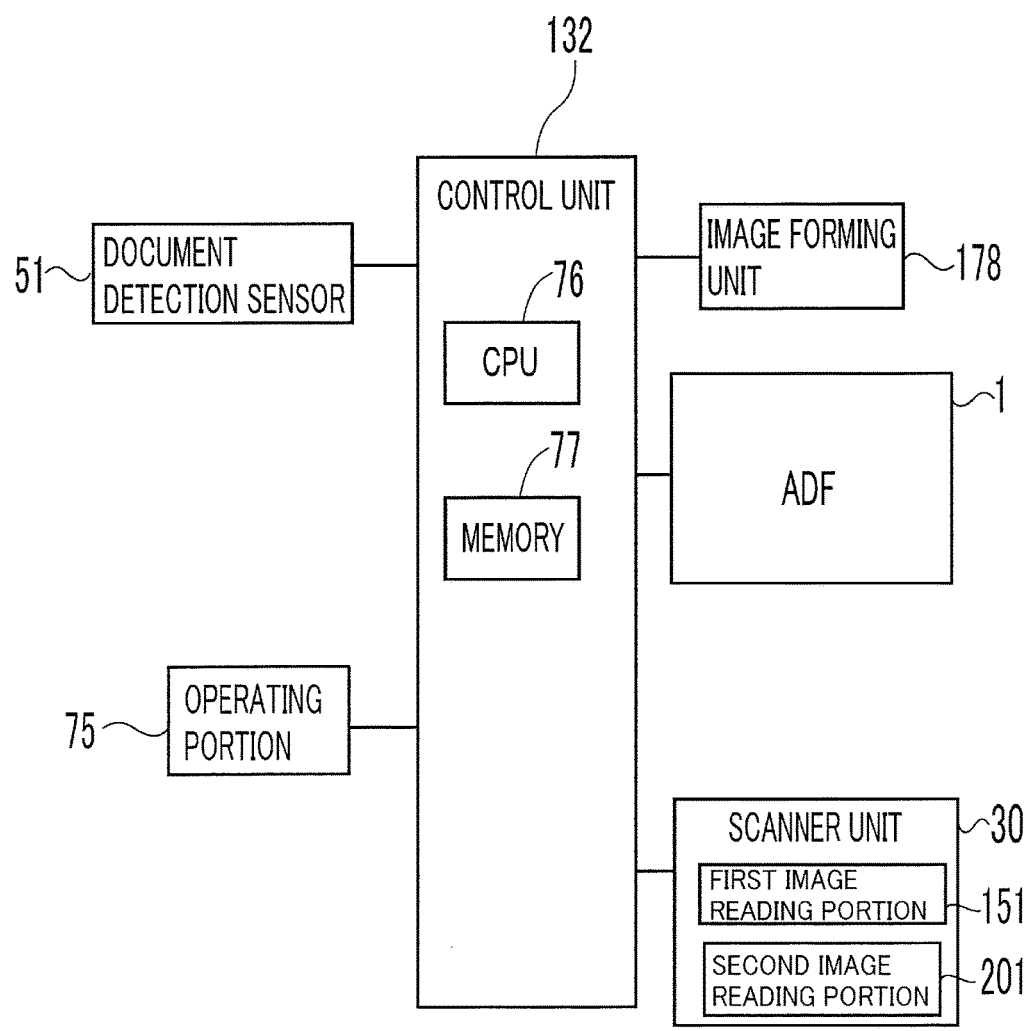
FIG. 5 is a block diagram illustrating a control system of the image forming apparatus.

Next, a control system according to the present embodiment will be described with reference to FIG. 5. FIG. 5 is a block diagram illustrating a control system of the image forming apparatus 101.

As illustrated in FIG. 5, the control unit 132 includes a CPU 76 configured to control the respective units, and a memory 77 configured of a ROM and a RAM storing various programs such as an image reading program or an image forming program, and various information.

A document detection sensor 51 configured to detect the presence of a document D on the document feed tray 2 and the operating portion 75 are connected to the control unit 132 so that respective signals can be entered to the control unit 132. The operating portion 75 is arranged on the upper surface of the scanner unit 30 at the front direction of the image forming apparatus 101, and it is composed of a touch panel capable of allowing selection and setting operations to be performed and having a display function. Moreover, the image forming unit 178, the ADF 1 and the scanner unit 30 are respectively connected to the control unit 132 so that driving signals from the control unit 132 can be received.

[Image Forming Operation]

Next, we will describe an image forming operation of the image forming apparatus 101 based on control of the control unit 132. In the present embodiment, an image forming operation in which an image is formed on a sheet S based on image information of document D automatically fed by the ADF 1 and read by the scanner unit 30 is illustrated.

In a state where the image information of the document D fed by the ADF 1 and read by the scanner unit 30 is entered to the control unit 132, the control unit 132 causes the exposure unit 123 to irradiate laser beams to the photosensitive drum 121 based on the entered image information. At this time, the photosensitive drum 121 is charged in advance by a charging unit 118, and an electrostatic latent image is formed by having laser beams irradiated thereon. Then, the electrostatic latent image is developed by a developing unit 124, and a toner image is formed on the photosensitive drum 121.

Simultaneously as the operation for forming a toner image on the photosensitive drum 121, the control unit 132 feeds the sheets S stored in the sheet supporting portions 137a through 137d of the sheet feeding unit 34 respectively by the corresponding feed rollers 32. The sheets S fed by the feed roller 32 are nipped at the separation nip portion formed between the corresponding conveyance roller 33a and separation roller 33b, separated one sheet at a time, and conveyed. The sheet S can also be fed from a manual feed tray 137e via a separating/feeding roller pair 138.

The sheet S fed from any one of the sheet supporting portions 137a through 137d or the manual feed tray 137e and separated one sheet at a time is conveyed via corresponding conveyance roller pairs 131 to the registration roller pair 136. The sheet S is subjected to skew feed by the registration roller pair 136 (skew feed correction), set at a matched position with the toner image on the photosensitive drum 121, and conveyed between the photosensitive drum 121 and the transfer electrifier 125. Further, the toner image on the photosensitive drum is transferred to the sheet S by the transfer electrifier 125, and the sheet S is separated from the photosensitive drum 121 by the separation charger 126. A cleaner 127 cleans a surface of the photosensitive drum 121 to which the toner image has been transferred. Then, the charging unit 118 charges the surface of the photosensitive drum 121 to prepare for the next exposure.

The sheet S to which the toner image has been transferred is conveyed by the belt conveyance unit 128 to the fixing unit 129, where the sheet is heated and pressed, such that the toner image is melted and fixed onto the sheet S. The sheet S to which the toner image has been fixed is discharged by the sheet discharge roller pair 40 to the sheet discharge tray 130, and sequentially stacked onto the tray. In a state where images are to be formed on both sides of the sheet S, at first, an image is formed on one side of the sheet S, before the sheet S is passed through a reverse conveyance path 95 to be conveyed again to the registration roller pair 136, where the above-described operation is performed gain to a rear side of the sheet S.

[Operation of Image Reading Apparatus]

Next, an operation in which images on both sides of the document D are read by the image reading apparatus 103, and the securing of gaps G1 and G2 in the conveyance path 60, will be described with reference to FIGS. 2 through 4.

In the image reading apparatus 103, as illustrated in FIG. 2, the document D supported on the document sheet feed tray 2 is fed by the feed roller 4 positioned at the solid line position, that is, position illustrated by the solid line. Then, the document D is separated one sheet at a time by the frictional force between the separation roller 5 and the retard roller 6. The leading edge of the separated document D is abutted against the registration roller pair 7 whose rotation is stopped.

The document D is continued to be conveyed by the separation roller 5 while the registration roller pair 7 is stopped, so that a loop is formed and skew feed is corrected. The document D having been subjected to skew feed correction is conveyed by the registration roller pair 7 to the conveyance roller pair 8, and sent into an image reading area A including the first image reading portion 151 and the second image reading portion 201 (refer to FIG. 2). At this time, the first surface D1 of the document D is read at the first reading position R1 of the first image reading portion 151, and the second surface D2 is read at the second reading position R2 of the second image reading portion 201. The document D whose images on both sides have been read is conveyed by a conveyance roller pair 9, sequentially discharged by the sheet discharge roller pair 10, and supported on the sheet discharge tray 3.

In the above description, the leading edge of the document D conveyed by the conveyance roller pair 8 is guided by the first guide surfaces 400a and 400c of the upstream conveyance guide 400, as illustrated in FIG. 3. Then, the document D abuts against the first scanning glass 152 upstream in the document conveying direction H of the first reading position R1 in the first image reading portion 151. Thereafter, the image on the first surface D1 of the document D is read by the first image reading portion 151 through the first scanning glass 152, and then the document D is guided by the first opposing guide surface 501 of the downstream conveyance guide 500 adjacent to the first scanning glass 152.

Then, the document D abuts against the second scanning glass 202 upstream in the document conveying direction of the second image reading position R2 in the second image reading portion 201. Thereafter, the image on the second surface D2 of the document D is read by the second image reading portion 201 through the second document feeding-reading glass, and then the document D is guided by the second opposing guide surface 503 of the downstream conveyance guide 500 and transferred to the conveyance roller pair 9 (refer to FIG. 2).

Figure 10:
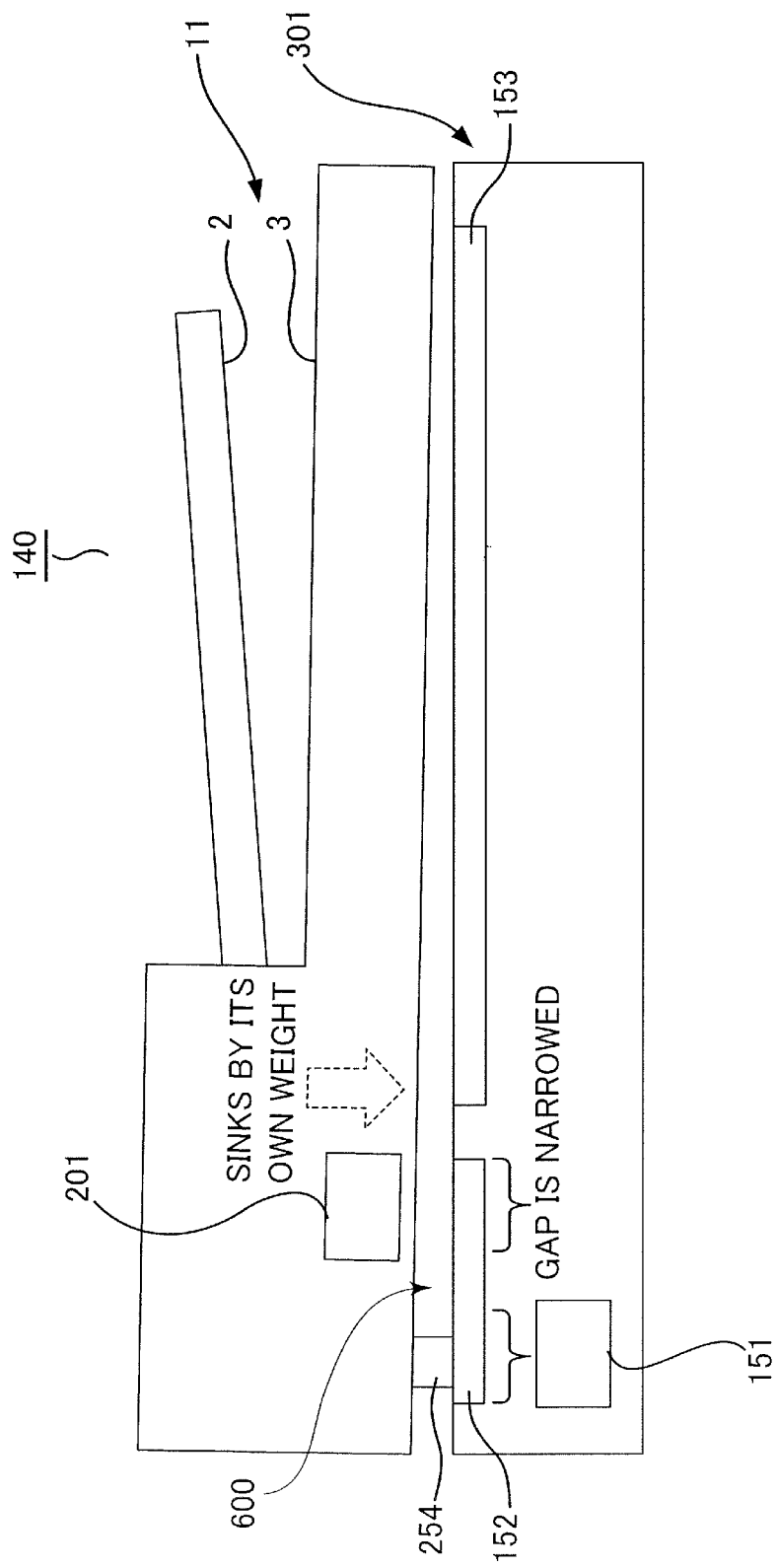
FIG. 10 is a schematic cross-sectional view illustrating an image reading apparatus according to a comparative example.

At this time, an image reading apparatus 140 according to a comparative example will be described with reference to FIG. 10. The image reading apparatus 140 has a projection 254 projecting downward from the ADF 11 at a position opposing to the first image reading portion 151 for reading the image on the first surface of the document, and in a state where the ADF 11 is closed, the projection 254 abuts against the first scanning glass 152, a gap of the conveyance path 600 between the scanner unit 301 and the ADF 11 is secured. The gap of the conveyance path 600 can be secured in a vicinity of the projection 254. However, at a distant position downstream in the document conveying direction of the projection 254, the ADF 11 sinks by its own weight, and it becomes difficult to secure the gap of the conveyance path 600 between the scanner unit 301 and the ADF 11. Since the gap is narrowed in this manner, there is fear that conveyance failure may occur in a state where thick paper having high stiffness or thin paper having low stiffness is conveyed or that image defects may occur in which an image is distorted specifically at a reading position of the second image reading portion 201 configured to read the image on the second surface of the document.

In contrast, according to the present embodiment, the projection members 154a and 154b of the conveyance path securing portion 154 are arranged substantially at a center position between the first reading position R1 of the first image reading portion 151 and the second reading position R2 of the second image reading portion 201 in the document conveying direction H, as illustrated in FIGS. 3 and 4. Therefore, both the gap G1 at the vicinity of the first reading position R1 of the first image reading portion 151 and the gap G2 at the vicinity of the second reading position R2 of the second image reading portion 201 can be secured highly accurately by the projection members 154a and 154b. Thereby, the occurrence of conveyance failure of thick paper or thin paper and the occurrence of image defects where image is distorted can be reduced.

<Second Embodiment>

Figure 6:
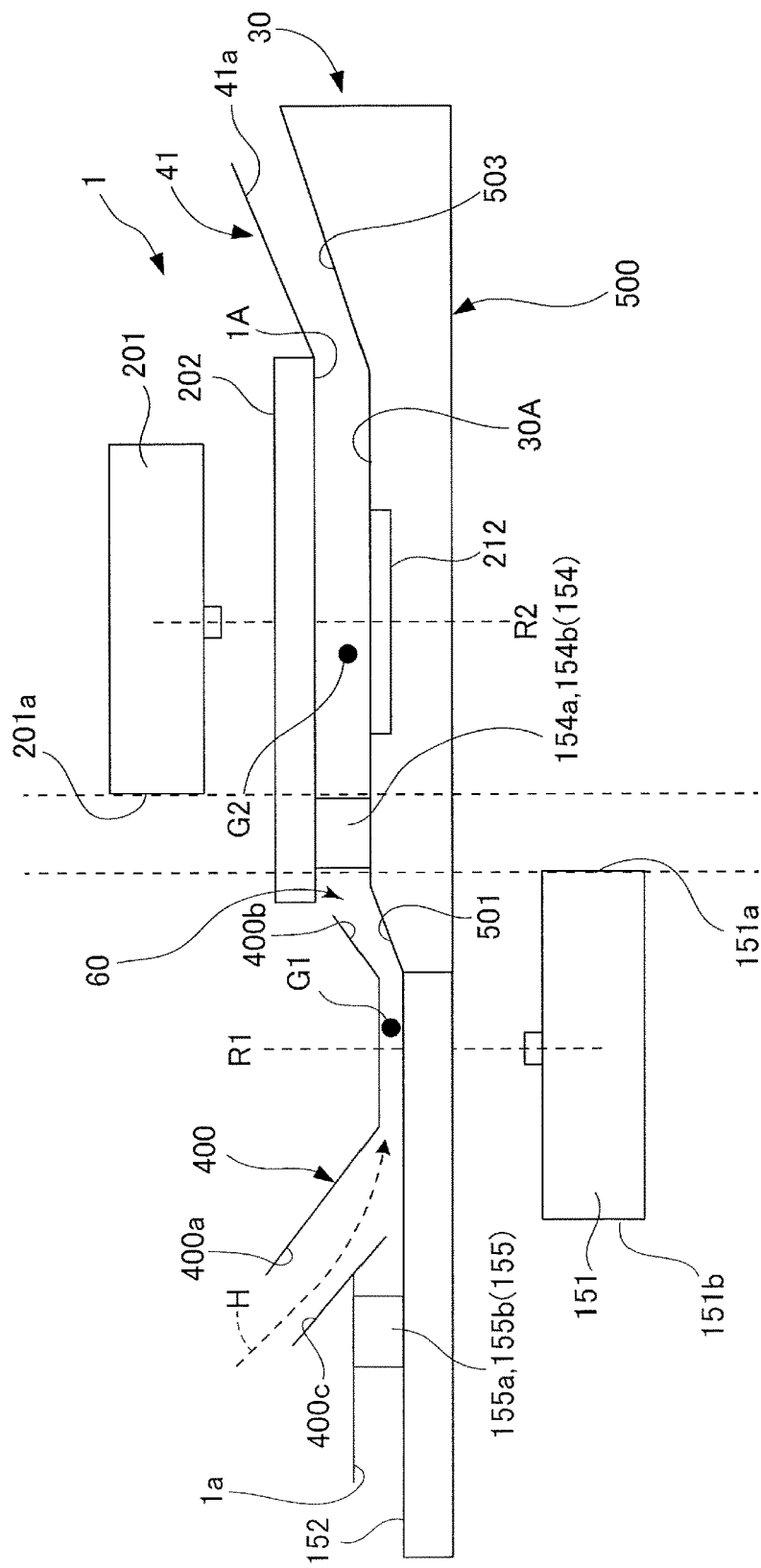
FIG. 6 is a schematic cross-sectional view illustrating a portion of an image reading apparatus according to a second embodiment in enlarged view.
Figure 7:
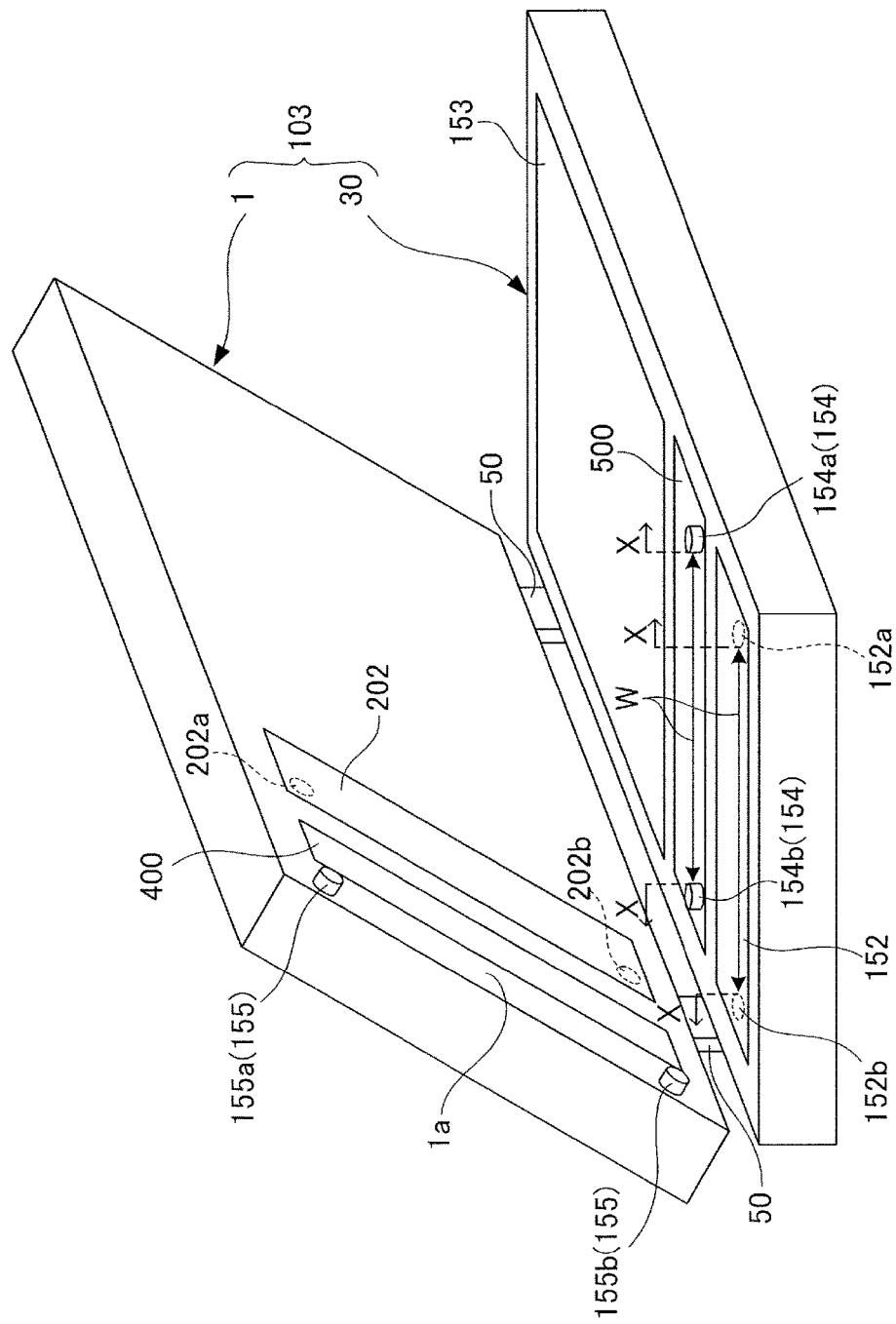
FIG. 7 is a perspective view illustrating a state in which an ADF is opened with respect to a scanner unit.

Next, a second embodiment of the present invention will be described with reference to FIGS. 6 and 7. FIG. 6 is a schematic cross-sectional view in which a portion of an image reading apparatus according to the present embodiment is enlarged, and FIG. 7 is a perspective view illustrating the image reading apparatus according to the present embodiment. In the present embodiment, the identical components as the first embodiment are denoted with the same reference numbers, and the descriptions of components having the same configurations and functions are omitted.

In the present embodiment, as illustrated in FIG. 6, conveyance path securing portions 154 and 155 are provided between the upper surface 30A of the scanner unit 30 and lower surface 1A of the ADF 1 in a state where the ADF 1 is closed with respect to the scanner unit 30. A conveyance path securing portion 155 serving as a second conveyance path securing portion is arranged upstream of the first reading position R1 of the first image reading portion 151 in the document conveying direction H, and secures the gaps G1 and G2 of the conveyance path 60 together with the conveyance path securing portion 154 serving as a first conveyance path securing portion. That is, the conveyance path securing portion 155 is arranged upstream of an upstream end 151b of the first image reading portion 151 in the document conveying direction H.

As illustrated in FIG. 7, the conveyance path securing portion 155 is arranged outside a sheet passing area W through which the sheet on the conveyance path 60 (refer to FIG. 6) passes in a width direction orthogonal to the document conveying direction. In the present embodiment, the conveyance path securing portion 155 has a projection member 155a on one side and a projection member 155b on the other side of a non-sheet passing area X outside in the width direction of the sheet passing area W. These projection members 155a and 155b are projected from an end portion 1a of the upstream conveyance guide 400 of the ADF 1, and in a state where the ADF 1 is closed, the members abut against abutting positions 152a and 152b upstream of the first scanning glass 152.

As described, the first scanning glass 152 is extended in the width direction to a position opposed to the non-sheet passing area X, and since the projection members 155a and 155b abut against the first scanning glass 152 directly, crossing of components can be reduced, and the gaps G1 and G2 can be secured highly accurately. Further, since the projection members 155a and 155b are arranged in the non-sheet passing area X, the members will not interfere with the document D being conveyed, and the members stably retain the ADF 1 at the front and back directions of the image forming apparatus 101, so that jamming is prevented effectively.

In the present embodiment, the gaps G1 and G2 of the conveyance path 60 can be secured by the conveyance path securing portion 155 positioned upstream of the first reading position R1 in addition to the conveyance path securing portion 154 positioned between the first reading position R1 of the first image reading portion 151 and the second reading position R2 of the second image reading portion 201 in the document conveying direction H. Specifically, the conveyance path securing portion 154 is arranged in the vicinity of the second reading position R2 of the second image reading portion 201, and the conveyance path securing portions 154 and 155 are arranged in the vicinity of the first reading position R1 of the first image reading portion 151. Therefore, the gaps G1 and G2 of the conveyance path 60 can be secured more stably by these conveyance path securing portions 154 and 155, and occurrence of conveyance failure of thick or thin paper or occurrence of image defects in which the image is distorted can be reduced.

<Third Embodiment>

Figure 8:
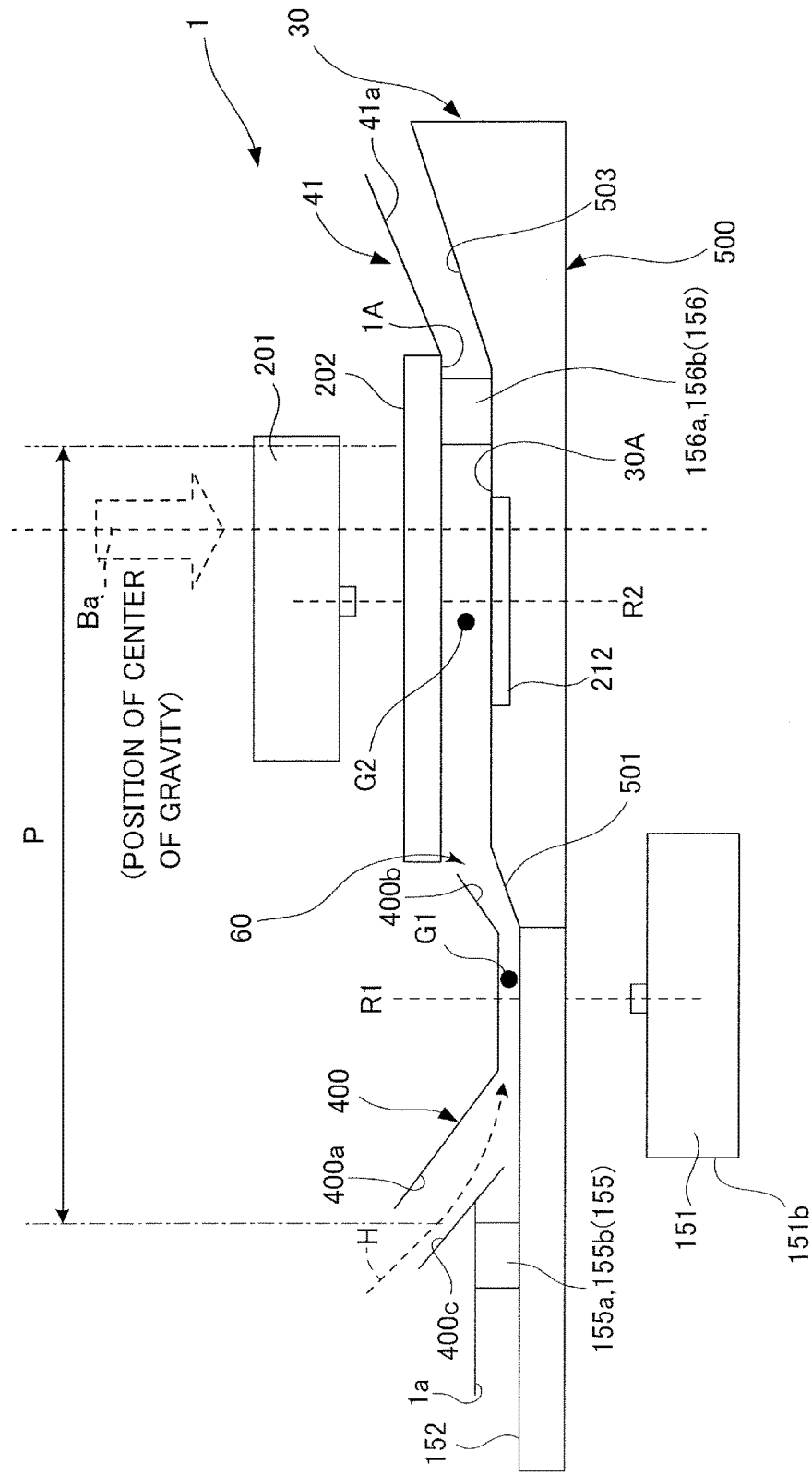
FIG. 8 is a schematic cross-sectional view illustrating a portion of an image reading apparatus according to a third embodiment in enlarged view.
Figure 9:
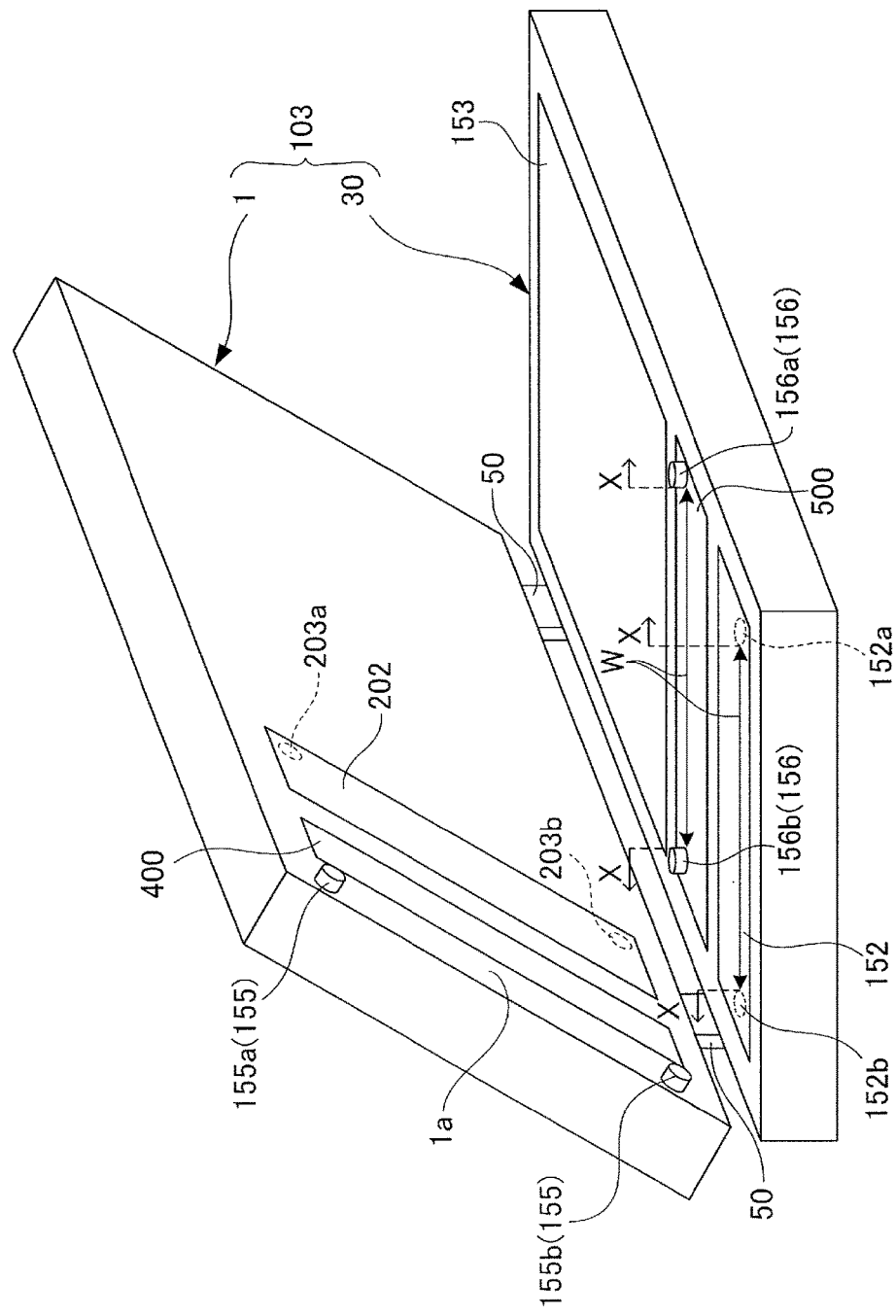
FIG. 9 is a perspective view illustrating a state in which an ADF is opened with respect to a scanner unit.

Next, a third embodiment of the present invention will be described with reference to FIGS. 8 and 9. FIG. 8 is a schematic cross-sectional view having enlarged a portion of an image reading apparatus according to the present embodiment, and FIG. 9 is a perspective view illustrating the image reading apparatus according to the present embodiment. According to the present embodiment, the identical components as the first and second embodiments are denoted with the same reference numbers, and the descriptions of components having the same configurations and functions are omitted.

In the present embodiment, as illustrated in FIG. 8, conveyance path securing portions 155 and 156 are provided between the upper surface 30A of the scanner unit 30 and the lower surface 1A of the ADF 1 in a state where the ADF 1 is closed with respect to the scanner unit 30. A conveyance path securing portion 156 serving as a third conveyance path securing portion is arranged downstream of the second reading position R2 in the second image reading portion 201 in the document conveying direction H, and secures the gaps G1 and G2 of the conveyance path 60 together with the conveyance path securing portion 155 serving as a fourth conveyance path securing portion.

As illustrated in FIG. 9, the conveyance path securing portion 156 is arranged outside a sheet passing area W through which the sheet on the conveyance path 60 (refer to FIG. 8) passes in a width direction orthogonal to the document conveying direction. In the present embodiment, the conveyance path securing portion 156 has a projection member 156a on one side and a projection member 156b on the other side of a non-sheet passing area X outside in the width direction of the sheet passing area W. These projection members 156a and 156b are projected from an upper surface of the scanner unit 30, and in a state where the ADF 1 is closed, the members abut against abutting positions 203a and 203b downstream of the second scanning glass 202.

According to the present embodiment, a position of a center of gravity Ba of the ADF 1 is set to an area between the conveyance path securing portion 155 arranged upstream in the document conveying direction H and the conveyance path securing portion 156 arranged downstream thereof, i.e., position of area P illustrated in FIG. 8. Thus, the projection members 155a, 155b, 156a and 156b can be abutted stably to respective positions, and the gaps G1 and G2 can be secured with higher reliability.

In the first to third embodiments, the gaps G1 and G2 of the conveyance path 60 are secured by the projection members 154a, 154b, 155a, 155b, 156a and 156b projected from the lower surface 1A of the ADF 1 or the upper surface 30A of the scanner unit 30, but the configuration is not restricted to this arrangement. That is, the number and shape of the projection members are not restricted, and the projection members can be disposed on either the ADF 1 side or the scanner unit 30 side. Further, rollers or other members can be adopted instead of a simple projection member.

The present embodiment has been illustrated with reference to an electro-photographic image forming apparatus 101, but the present invention can also be applied, for example, to an inkjet image forming apparatus configured to form images on sheets by discharging liquid ink through nozzles.

<Other Embodiments>

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-080589, filed Apr. 13, 2016, which is hereby incorporated by reference wherein in its entirety.

What is claimed is:

1. An image reading apparatus comprising:
    a main body unit;
    a sheet conveyer openably supported on the main body unit and configured to convey a sheet;
    a conveyance path comprising a first transparent member provided on an upper surface of the main body unit, and a second transparent member provided on a lower surface of the sheet conveyer, through which the sheet conveyed by the sheet conveyer passes;
    a first image reading portion provided on the main body unit, and configured to read an image on a first surface of the sheet conveyed on the conveyance path via the first transparent member at a first reading position;
    a second image reading portion provided on the sheet conveyer downstream of the first image reading portion in a sheet conveyance direction, and configured to read an image on a second surface opposite from the first surface of the sheet conveyed on the conveyance path via the second transparent member at a second reading position; and
    a projection portion arranged between the first reading position of the first image reading portion and the second reading position of the second image reading portion in the sheet conveyance direction, and projected from one of the upper surface of the main body unit and the lower surface of the sheet conveyer, the projection portion being arranged outside an area through which the sheet on the conveyance path passes in a width direction orthogonal to the sheet conveyance direction, a gap of the conveyance path in a height direction between the upper surface of the main body unit and the lower surface of the sheet conveyer being secured by the projection portion abutting against the other of the upper surface and the lower surface outside the area.

2. The image reading apparatus according to claim 1, wherein the projection portion is provided on the main body unit and abuts against the second transparent member in a state where the sheet conveyer is closed.

3. The image reading apparatus according to claim 1, wherein the projection portion comprises a first member disposed on one side in the width direction with respect to the area, and a second member disposed on the other side in the width direction with respect to the area.

4. The image reading apparatus according to claim 1, wherein the projection portion is arranged between a downstream end of the first image reading portion and an upstream end of the second image reading portion with respect to the sheet conveyance direction.

5. The image reading apparatus according to claim 1, wherein the projection portion is a first projection portion, and
the image reading apparatus further comprises a second projection portion arranged upstream of the first reading position in the first image reading portion in the sheet conveyance direction, and configured to secure the gap of the conveyance path together with the first projection portion in a state where the sheet conveyer is closed.

6. The image reading apparatus according to claim 5, wherein the second projection portion is provided on the sheet conveyer, and the second projection portion abuts against the first transparent member in a state where the sheet conveyer is closed.

7. An image forming apparatus comprising:
the image reading apparatus according to claim 1; and
an image former configured to form an image on another sheet based on an image information read from the sheet by the image reading apparatus.

8. An image reading apparatus comprising:
a main body unit;
a sheet conveyer openably supported on the main body unit and configured to convey a sheet;
a conveyance path comprising a first transparent member provided on an upper surface of the main body unit, and a second transparent member provided on a lower surface of the sheet conveyer, through which the sheet conveyed by the sheet conveyer passes;
a first image reading portion provided on the main body unit, and configured to read an image on a first surface of the sheet conveyed on the conveyance path via the first transparent member at a first reading position;
a second image reading portion provided on the sheet conveyer downstream of the first image reading portion in a sheet conveyance direction, and configured to read an image on a second surface opposite from the first surface of the sheet conveyed on the conveyance path via the second transparent member at a second reading position;
a third projection portion arranged downstream of the second reading position of the second image reading portion in the sheet conveyance direction and projected from one of the upper surface of the main body unit and the lower surface of the sheet conveyer, the third projection portion being arranged outside an area through which the sheet on the conveyance path passes in a width direction orthogonal to the sheet conveyance direction; and
a fourth projection portion arranged upstream of the first reading position of the first image reading portion in the sheet conveyance direction and projected from the other of the upper surface of the main body unit and the lower surface of the sheet conveyer, the fourth projection portion being arranged outside the area, a gap of the conveyance path in a height direction between the upper surface and the lower surface being secured by the third projection portion abutting against the other of the upper surface and the lower surface and by the fourth projection portion abutting against the one of the upper surface and the lower surface outside the area.

9. The image reading apparatus according to claim 8, wherein a center of gravity of the sheet conveyer is positioned between the third projection portion and the fourth projection portion in the sheet conveyance direction.

10. The image reading apparatus according to claim 8, wherein the third projection portion is provided on the main body unit and abuts against the second transparent member in a state where the sheet conveyor is closed.

11. The image reading apparatus according to claim 8, wherein the third projection portion comprises a first member disposed on one side in the width direction with respect to the area, and a second member disposed on the other side in the width direction with respect to the area.

12. The image reading apparatus according to claim 8, wherein the fourth projection portion is provided on the sheet conveyer and abuts against the first transparent member in a state where the sheet conveyer is closed.

13. An image forming apparatus comprising:
the image reading apparatus according to claim 8; and
an image former configured to form an image on another sheet based on an image information read from the sheet by the image reading apparatus.

14. An image reading apparatus comprising:
a main body unit;
a sheet conveyer openably supported on the main body unit and configured to convey a sheet;
a conveyance path comprising a first transparent member provided on an upper surface of the main body unit, and a second transparent member provided on a lower surface of the sheet conveyer, through which the sheet conveyed by the sheet conveyer passes;
a first image reading portion provided on the main body unit, and configured to read an image on a first surface of the sheet conveyed on the conveyance path via the first transparent member at a first reading position;
a second image reading portion provided on the sheet conveyer downstream of the first image reading portion in a sheet conveyance direction, and configured to read an image on a second surface opposite from the first surface of the sheet conveyed on the conveyance path via the second transparent member at a second reading position;
a fifth projection portion arranged downstream of the second reading position of the second image reading portion in the sheet conveyance direction and projected from one of the upper surface of the main body unit and the lower surface of the sheet conveyer, the fifth projection portion being arranged outside an area through which the sheet on the conveyance path passes in a width direction orthogonal to the sheet conveyance direction; and
a sixth projection portion arranged upstream of the first reading position of the first image reading portion in the sheet conveyance direction and projected from the one of the upper surface of the main body unit and the lower surface of the sheet conveyer, the sixth projection portion being arranged outside the area, a gap of the conveyance path in a height direction between the upper surface and the lower surface being secured by the fifth and sixth projection portions abutting against the other of the upper surface and the lower surface outside the area.

15. An image forming apparatus comprising:
the image reading apparatus according to claim 14; and
an image former configured to form an image on another sheet based on an image information read from the sheet by the image reading apparatus.

* * * * *